United States Patent
Boulos et al.

(10) Patent No.: US 9,104,449 B2
(45) Date of Patent: Aug. 11, 2015

(54) OPTIMIZED EXECUTION OF DYNAMIC LANGUAGES

(75) Inventors: Solomon Boulos, San Francisco, CA (US); Jeremy Sugerman, Palo Alto, CA (US)

(73) Assignee: Google Inc., Mountain View, CA (US)

(*) Notice: Subject to any disclaimer, the term of this patent is extended or adjusted under 35 U.S.C. 154(b) by 399 days.

(21) Appl. No.: 13/526,328

(22) Filed: Jun. 18, 2012

(65) Prior Publication Data

US 2013/0339936 A1    Dec. 19, 2013

(51) Int. Cl.
*G06F 9/45*     (2006.01)
*G06F 9/455*    (2006.01)

(52) U.S. Cl.
CPC .................. *G06F 9/45508* (2013.01)

(58) Field of Classification Search
CPC .................................................. G06F 9/45508
USPC ......................................................... 717/153
See application file for complete search history.

(56) References Cited

U.S. PATENT DOCUMENTS

| | | | |
|---|---|---|---|
| 5,530,964 A * | 6/1996 | Alpert et al. | 717/158 |
| 7,389,317 B2 * | 6/2008 | Guttag et al. | 708/620 |
| 8,095,507 B2 * | 1/2012 | Wu et al. | 707/634 |
| 8,392,881 B1 | 3/2013 | Lund et al. | |
| 2009/0307430 A1 * | 12/2009 | Bruening et al. | 711/119 |
| 2011/0179347 A1 * | 7/2011 | Proctor et al. | 715/234 |
| 2011/0321010 A1 | 12/2011 | Wang | |
| 2013/0159978 A1 * | 6/2013 | Jazdzewski et al. | 717/129 |

* cited by examiner

*Primary Examiner* — Ryan Coyer
*Assistant Examiner* — Sen Chen
(74) *Attorney, Agent, or Firm* — McDermott Will & Emery LLP (57) ABSTRACT

Program code in a dynamic language is executed through a dynamic execution module that includes an execution context and an execution codebase. The instructions of the program code are translated into machine code that is stored in the execution codebase, and the execution context tracks the runtime state and persistent state of the program through executions and across executions. Using the execution codebase and the execution context the dynamic execution module minimizes duplicative machine code generation, while preserving the dynamic aspects of the program.

20 Claims, 4 Drawing Sheets

OPTIMIZED EXECUTION OF DYNAMIC LANGUAGES

BACKGROUND

1. Field of Disclosure

This disclosure generally relates to the fields of dynamic computer program languages and just-in-time code generation. Specifically, the disclosure describes a system, method, and process for the optimized execution of dynamic computer program languages through context tracking and just-in-time code generation.

2. Description of the Related Art

Dynamic languages such as PHP: Hypertext Preprocessor (PHP), Python, Ruby, and Perl have been adopted heavily for web development and applications development because they allow for high developer productivity. There are many features of these languages that contribute to their productive characteristics, but two of the most important are runtime typing and the ability to evaluate new data as code dynamically. These characteristics allow developers to write code that can be used more flexibly than static code written in a language such as C, Java, or C++. For example, the dynamic languages enable more flexible development practices by allowing developers to conditionally generate new executable code from existing code, at runtime, to handle novel data.

The disadvantage of dynamic languages is that their execution is typically significantly slower than that of static languages (which may enforce compile time static typing and which may not allow dynamic code execution). Because the types of functions and variables are known at compile time, and because the full scope of executable code is known by the compiler, a static language can be translated to machine code efficiently prior to a program's execution. In the case of a dynamic language, the full scope of the executable code is not known, and the types of many functions and variables may not be known until the moment the code is executed. For these reasons a dynamic language cannot be completely converted to machine code prior to execution. In addition, even runtime translation to machine code is often impractical because the just-in-time compilation process may itself require significant execution resources leading to diminished performance during execution.

SUMMARY

The disclosed configuration comprises a system, method, and computer-readable medium for executing computer programs through a dynamic execution module. The disclosed configuration includes a computer-implemented method wherein a first request to execute a program code is received. The program code here comprises initial code and runtime conditional code. Responsive to the first request, execution resources are generated from the initial code, where the execution resources comprise an execution codebase and an execution context. The execution codebase comprises machine code generated from the initial code, and the execution context comprises stored references to elements generated for functions, variables, and user-defined types in the initial code. The machine code in the execution codebase is executed and the execution codebase and execution context are updated using the runtime conditional code. A second request to execute the program code is then received and the machine code in the updated execution codebase is executed using the updated execution context.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
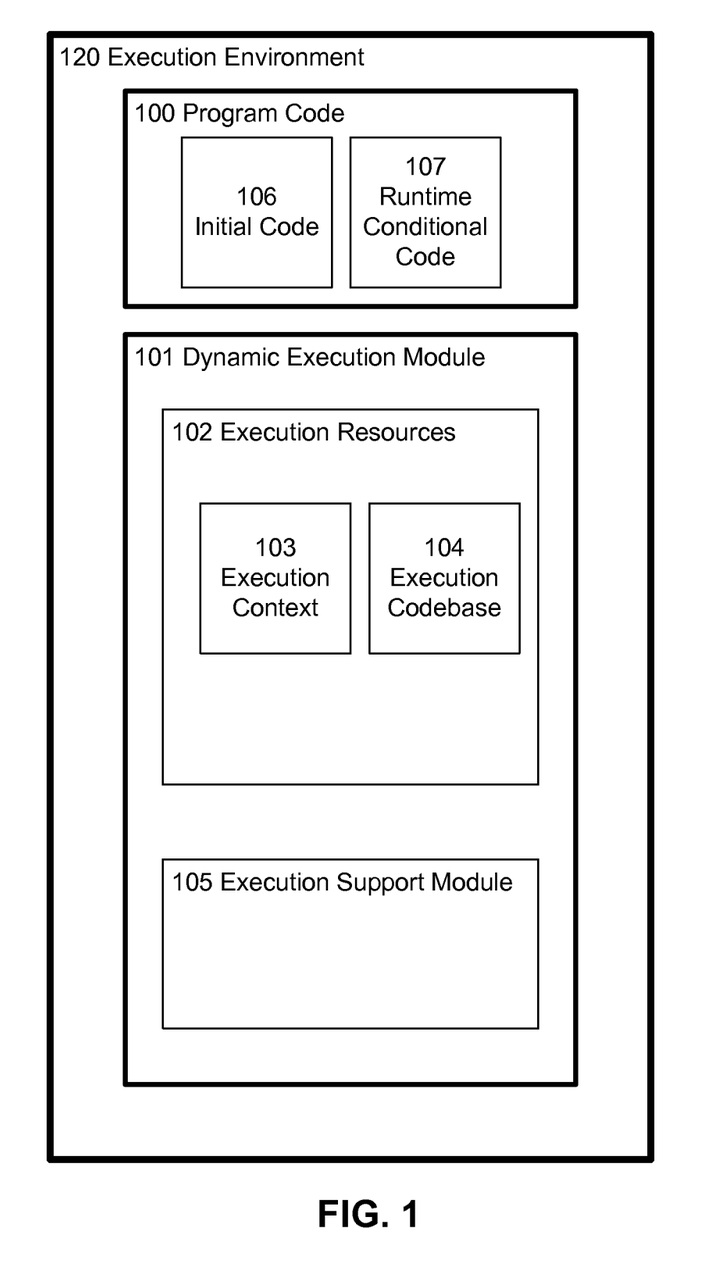
FIG. 1 is a high-level block diagram illustrating an example embodiment of a dynamic execution module in an execution environment.

FIG. 1 illustrates program code 100 and dynamic execution module 101 in an execution environment 120. The execution environment 120 comprises one or more computer systems that can host and execute computer program instructions. In one embodiment the execution environment 120 is a single computer system such as a web server. In another embodiment the execution environment comprises several computer systems connected by a network, such as server computers in a data center.

The program code 100 includes computer source code in, for example, computer languages such as Python, Perl, Ruby, PHP, etc. The program code 100 may comprise initial code 106 and runtime conditional code 107. The initial code 106 includes computer instructions that are loaded when execution of the program code 100 is initiated. For example, the initial code 106 may include a file with the "main function" or "main loop" of a program. The initial code 106, when executed, may load additional computer program instructions called the runtime conditional code 107. The runtime conditional code 107 may be conditionally loaded based on circumstances that are determined after execution has been initiated. For example, the runtime conditional code 107 may include computer instructions that are loaded from a database, at runtime, based on a current execution of the program code 100.

The dynamic execution module 101 is a component of the execution environment 120 that enables more efficient execution of the program code 100. The dynamic execution module 101 replaces the standard virtual machine or interpreter for a programming language such as PHP, Perl, Python, or Ruby. The dynamic execution module 101 may be a software module executing on hardware which also executes other processes of the execution environment 120, or it may execute on its own dedicated hardware resources. When the program code 100 is executed in the execution environment 120, the dynamic execution module 101 manages and monitors this execution to ensure that the execution is both fast and efficient. The dynamic execution module 101 may improve the execution of the program code 100 by using just-in-time machine code generation, code fragment tracking, machine code reuse, context tracking, and other techniques. Some of these techniques are described in more detail herein.

The dynamic execution module 101 includes execution resources 102 and an execution support module 105. The execution resources 102 are resources that are generated for a particular program code 100, some of which may persist across several invocations of the same code. The execution resources 102 include an execution context 103 and an execution codebase 104. The execution context 103 stores both the dynamic runtime state of a particular program as it is executing as well as the structure and the state of the program code 100 that may persist across different executions. The execution context 103 comprises structures that store references to elements that have been generated for functions, variables, and user-defined types (e.g., classes, structures, etc.) in the program code 100. The execution context 103 may be reset between invocations of the program code 100 to prevent the dynamic values from one invocation from polluting the next invocation of the code. However, the execution context reset may be performed such that the non-volatile data, which may be migrated between invocations, is maintained. The execution codebase 104 stores machine code that has been generated from the program code 100 during this execution of the program as well as previous executions. The execution codebase 104 serves as a cache for the machine code generated from the program code 100, so that code generation need not be duplicated between invocations of the program. The execution context 103 serves to keep track of the parts of the machine code in the execution codebase 104 that are relevant to the current invocation of the program (e.g. the machine code for the current invocation's definitions of functions, etc.). The execution support module 105 provides runtime support to the dynamic execution module 101, such as, for example, just-in-time machine code generation, execution management, etc.

Figure 2:
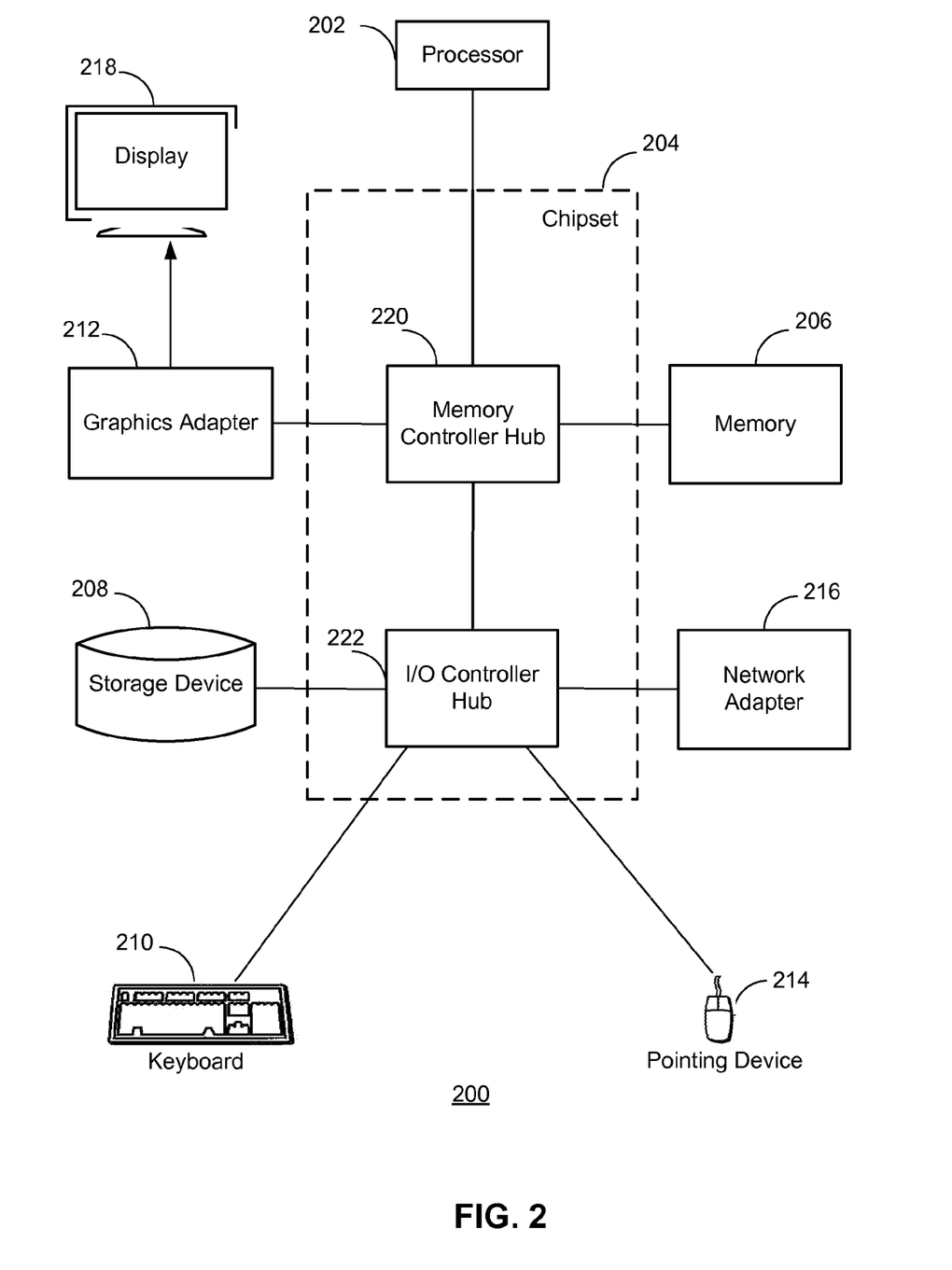
FIG. 2 is a high-level block diagram illustrating an example computer.

The entities shown in FIG. 1 are implemented using one or more computers or modules within such computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the execution environment 120 might comprise multiple blade servers working together to provide the functionality described herein. The computers 200 can lack some of the components described above, such as keyboards 210, graphics adapters 212, and displays 218.

Figure 3:
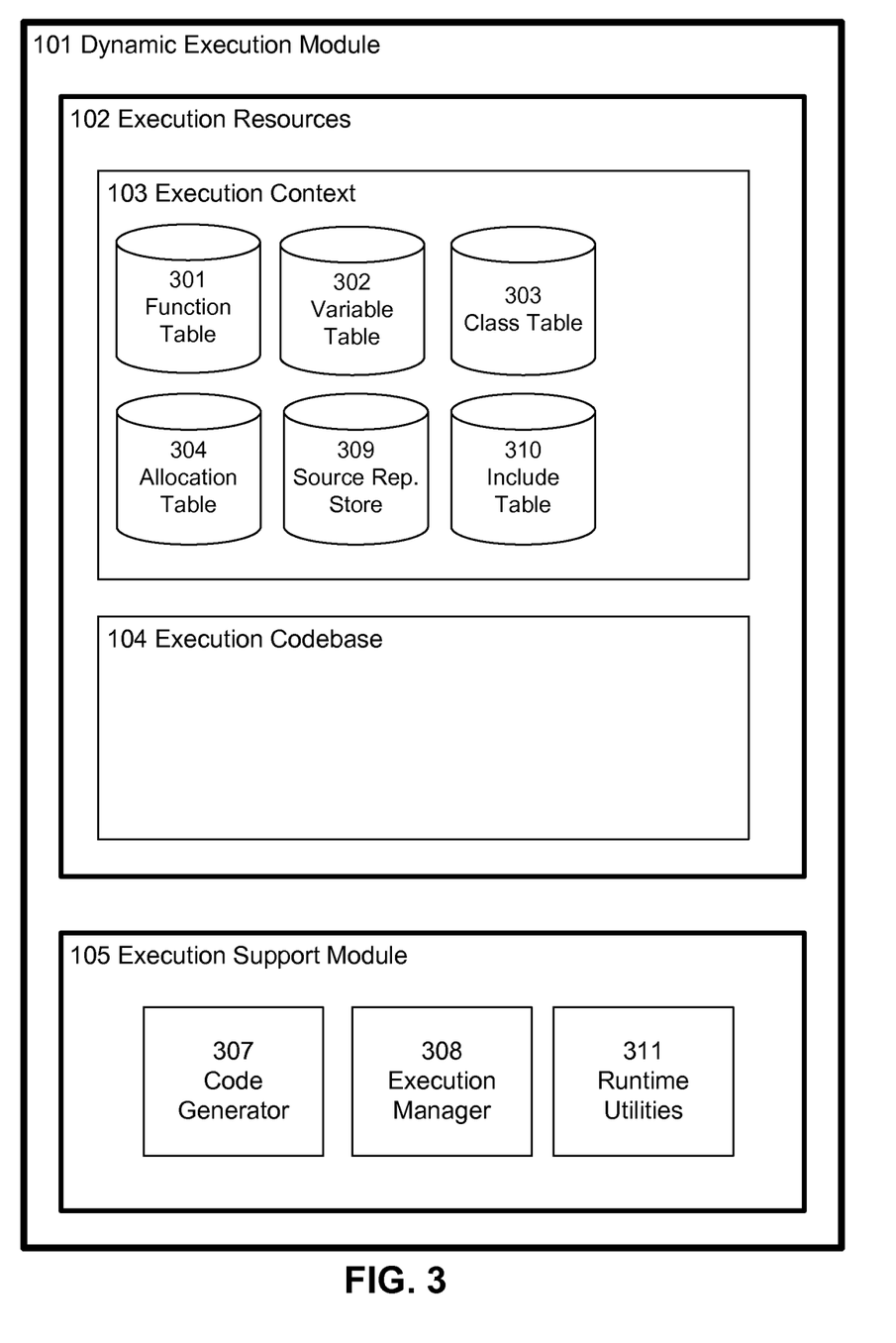
FIG. 3 is a block diagram illustrating a detailed view of components within a dynamic execution module, according to one embodiment.

FIG. 3 is a high-level block diagram illustrating a detailed view of components within a dynamic execution module 101, according to one embodiment. As discussed previously, the dynamic execution module 101 comprises execution resources 102 and the execution support module 105. The execution resources 102 further comprise an execution context 103 and an execution codebase 104.

As mentioned previously, the execution context 103 stores data that captures the current runtime state of a program execution as well as information that can be persisted across program invocations to speed future executions of the same program code. The execution context 103 includes a function table 301, variable table 302, allocation table 304, source representation store 309, and include table 310. The execution context 103 may also include tables for various user-defined types, such as a class table 303. The tables necessary for user-defined types will depend on the particular dynamic language that is executed by the dynamic execution module 101. In the case of PHP, a class table 303 may be used, but in the case of a non-object oriented language without classes, a class table 303 may be unnecessary, while other user-defined types may be tracked using similar tables.

The allocation table 304 is a data structure that contains both non-volatile data defined in the initial code 106 and the elements that are dynamically allocated at runtime during an invocation of the program. For example, the allocation table 304 stores variables, structures and user-defined types (such as classes) that are declared in the program code 100. The dynamic execution module 101 may reduce the amount of runtime memory allocations made by the program code 100 by pre-allocating space in the allocation table 304 based on the memory used by previous invocations of the program code 100, and by maintaining the non-volatile data in the allocation table 304 between resets of the execution context 103. Examples of data that are persisted across separate executions of the program code 100 include global constants, global variables, global classes, etc. The elements that are stored in the allocation table 304 may be referenced by entries in the variable table 302 and class table 303.

The function table 301 is a data structure that maps functions, by name and code context, to compiled machine code in the execution codebase 104. The code context is the context—e.g. parameters, includes, namespaces, etc.—with which the function is invoked. In a dynamic language the code context of a function call may change the code executed by a function invocation. For example, a conditional include statement before a function invocation that changes the code that is bound to a function name may cause the function to invoke a different code fragment than it did in a previous execution, even though the function name and parameters are the same.

When the program code 100 is executed and encounters a call to a function that has been defined in the same code context previously—either in a previous execution of the program code 100 or during the same execution at an earlier time—machine code generation for that function will be unnecessary as the machine code previously generated for the same function in the same code context can be accessed through the mapping in the function table 301. On the other hand, if a novel function is encountered, or if a known function is encountered in a new code context, then new machine code can be generated for the function and a reference to this machine code can be inserted into an appropriate entry in the function table 301. In this way machine code that has been generated in the past can be reused without sacrificing the flexibility of dynamically generated functions that invoke different code based on context.

The variable table 302 maps variable names to variables stored in the allocation table 304. Similarly user-defined types may have tables that map named instances of those types to allocations in the allocation table 304. For example, the class table 303 maps class names to classes stored in the allocation table 304. This mapping can be modified at runtime based on the changing code context of a variable or user-defined type. This allows the dynamic execution module 101 to support dynamic changes to variables and user-defined types at runtime while still enabling optimizations, and reusability in circumstances when the variables and user-defined types are non-volatile.

The function table 301, variable table 302, and tables for the user-defined types (such as the class table 303) may allow unconditional and built-in data, which is not dynamically modified, to be persisted across independent executions of the program code 100. This persistence of unconditional and built-in data may speed the initial setup necessary for new invocations of the program code 100 by minimizing the initialization necessary for built-in and non-volatile data.

The source representation store 309 comprises representations of the instructions in the program code 100 that have been processed by the dynamic execution module 101. The source representation store 309 may store the instructions of the program code 100 in a manner that makes accessing the structure of the instructions quicker for the dynamic execution module 101 processes. For example, in one embodiment the instructions from the program code 100 are stored in the source representation store 309 in the form of control flow graphs (CFGs). In another embodiment the instructions of the program code 100 are stored in the form of abstract syntax trees (ASTs). Such structural embodiments may speed the code generation and code indexing.

For example, assuming the program code 100 includes PHP instructions as follows:

```
<?php
function __autoload($className) {
    class ExampleClass {
        var $exampleProp;
    }
}
$object = new ExampleClass( );
$object->exampleProp = $_GET['arg'];
if ($object->exampleProp) {
    function Conditional( ) { return "First Condition\n"; }
} else {
    function Conditional( ) { return "Second Condition\n"; }
}
print Conditional( );
?>
```

In one implementation, the source representation store 309 may contain a corresponding CFG that (represented as text instead of binary data) may look like:

```
CFG: <PHPEntryFunc>: 4 blocks, 9 registers, and 10 constants.
Block[0], 11 op(s):
    DEFINE_FUNC(__autoload)
    %0 = VARIABLE($object ($0), #0)
    %1 = CLASS_CTOR("ExampleClass", %0)
    ASSIGN<,>(%0, %1)
    %2 = SUPERGLOBAL<2>
    %3 = ARRAY_ACCESS(%2, "arg")
    %4 = VARIABLE($object ($0), #1)
    %5 = PROP_ASSIGN<,>(%4, "exampleProp", %3)
    %6 = VARIABLE($object ($0), #2)
    %7 = PROP_REF<0>(%6, "exampleProp")
    BR<1>(%7, Block[1], Block[2])
Block[1], 2 op(s):
    DEFINE_FUNC(Conditional [v1])
    BR<0>(Block[3])
Block[2], 2 op(s):
    DEFINE_FUNC(Conditional [v2])
    BR<0>(Block[3])
Block[3], 3 op(s):
    %8 = CALL<1>("Conditional", %0)
    ECHO<1>(%8)
    RETURN
CFG: __autoload( ): 1 block, 0 registers, and 3 constants.
Block[0], 2 op(s):
    DEFINE_CLASS<0>(ExampleClass)
    RETURN
CFG: Conditional( ) [v1]: 1 block, 0 registers, and 3 constants.
Block[0], 1 op(s):
    RETURN("First Condition\n")
CFG: Conditional( ) [v2]: 1 block, 0 registers, and 3 constants.
Block[0], 1 op(s):
    RETURN("Second Condition\n")
```

The above is a formatted printout of the contents of one possible CFG. In memory this CFG may be stored in a different form. CFGs may be structured in different forms depending on the specific implementation details of the dynamic execution module, and when printed, these CFGs may give text representations that are different than what is shown above, for the same PHP code.

The include table 310 contains a mapping of instructions in the program code 100 to machine code that has been generated for those instructions and which may be stored in the execution codebase 104. As program code 100 is processed by the dynamic execution module 101, the source representations of the instructions in program code are stored in the source representation store 309. The include table 310 keeps an entry for each piece of code that is imported at runtime, with a reference to the execution codebase 104 where the machine code for that piece of code is located. The entries in the include table 310 may also include a reference to the source representation store 309, to indicate the program code instructions corresponding to the machine code. The entry may include a mechanism that keeps track of whether the program code 100 has changed since the machine code was generated (for example a time stamp). If a change is detected, the dynamic execution module 101 will activate processes to generate new machine code for the changed part of the program code 100.

The execution codebase 104 stores the machine code that is generated by the dynamic execution module 101 from the program code 100. When a given program code 100 is executed for the first time the execution codebase 104 contains no machine code for that program. The dynamic execution module 101 generates machine code from the program code 100 as the program is first executed. On subsequent executions of the same program code 100, the execution codebase 104 will have machine code already present for that program. This previously generated machine code may be executed directly without further code generation. If the current invocation of the program code 100 executes instructions that were not executed in the past, and for which there is no machine code in the execution codebase 104, then the dynamic execution module 101 will generate machine code for these instructions and store them in the execution codebase 104. The machine code in the execution codebase 104 includes user code and system code. The user code corresponds to machine code that is generated directly from the instructions in the program code 100. The system code is code that is generated by the dynamic execution module 101 to tie the user code together and to enable it to operate with the execution context 102 and other components of the dynamic execution module 101. The system code allows the user code to take advantage of the reusability and performance optimization enabled by the execution context 103. For example, for a variable reference in the program code 100, the dynamic execution module 101 may generate machine code that does a lookup into an entry for that variable in the variable table 302 and then uses the table entry as the variable value in the program.

For example, assuming the program code 100 contains the following PHP code:

```
<?php
function ExampleFunction( )
{
    $var = "Example String\n";
    $varVar = 'var';
    print $$varVar;
}
ExampleFunction( );
?>
```

The following machine code may be generated by the dynamic execution module 101 for the above PHP code:

```
ExampleFunction( ):
    push    %rbp
    mov     %rsp,%rbp
    push    %r15
    push    %r12
    push    %rbx
    sub     $0x20,%rsp
    movabs  $0x7ffff7feadd0,%rax
    callq   *%rax           ; DynVariables_Enter( )
    mov     %rax,%r15
    movabs  $0x7ffff01f2410,%rdi
    lea     -0x40(%rbp),%rsi
    movabs  $0x7ffff7feae40,%rax
    movabs  "var",%rcx
    movabs  "Example String\n",%rdx
    movl    $0x4,-0x34(%rbp)
    movl    $0x4,-0x24(%rbp)
    mov     %rdx,-0x40(%rbp)
    movl    $0x2,-0x34(%rbp)
    mov     %rcx,-0x30(%rbp)
    movl    $0x2,-0x24(%rbp)
    mov     %r15,%rdx
    callq   *%rax           ; DynVariables_Lookup( )
    cmpl    $0x2,0xc(%rax)
    jne     b0
    mov     (%rax),%rax
    jmpq    b1
b0:
    movabs  "<Current file name>",%rsi
    movabs  $0x7ffff7f51f88,%rcx
    mov     %rax,%rdi
    callq   *%rcx           ; ConvertToString( )
b1:
    mov     %rax,%r12
    movabs  $0x7ffff61d7be0,%rax
    mov     %r12,%rdi
    callq   *%rax ; strlen( )
    movabs  $0x7ffff7f51c40,%rcx
    mov     %r12,%rdi
    mov     %rax,%rsi
```

```
    callq   *%rcx           ; DoOutput( )
    movabs  $0x7ffff04c2aa0,%rax
    mov     %rbx,(%rax)
    movabs  $0x7ffff01f2410,%rdi
    movabs  $0x7ffff7feadf0,%rax
    mov     %r15,%rsi
    callq   *%rax           ; DynVariables_Reset( )
    movabs  thePHPNull,%rax
    add     $0x20,%rsp
    pop     %rbx
    pop     %r12
    pop     %r15
    pop     %rbp
    retq
```

Here the DynVariables functions are functions from the runtime utilities 311 that update and access the variable table 302. The ConvertToString function turns a variable of arbitrary type to a string, while the strlen function is a standard C library function that gives the length of a string. The DoOutput function is a function from the runtime utilities 311 that produces output. This machine code performs the same processes as the PHP code by using these functions from the runtime utilities 311 to interface with the execution resources 102 (such as the variable table 302). These functions provide the program with access to dynamic values for all functions, variables, classes, etc., thus enabling the machine code program to implement a program in a dynamic language.

The execution support module 105 is a component of the dynamic execution module 101 that provides support and management for the dynamic execution process. The execution support module 105 comprises a code generator 307, an execution manager 308, and runtime utilities 311. The execution manager 308 initiates, monitors, manages, and terminates execution of the program code 100 in the dynamic execution module 101. When the program code 100 is invoked using the dynamic execution module 101, the execution manager 308 coordinates the activation of the other components of the dynamic execution module, as needed, so that the program code 100 is executed correctly.

The execution manager 308 activates the code generator 307 to generate machine code from the program code instructions. The generated machine code is stored in the execution codebase 104 so that at least some of the same machine code may be reused in different invocations of the program code 100. This is an optimization that helps to minimize the code generation that is done for the program code 100. This optimization can occur across separate invocations of the program code 100, as well as in the case where the same code fragment is executed multiple times within the same invocation of the program code. The execution manager 308 determines the code generation needed for a given program code 100 by using the include table 310 and the source representation store 309 to track the parts of the program code 100 that already have corresponding machine code stored in the execution codebase 104. When the code generator 307 is used to generate machine code, the corresponding program code fragment is placed in the source representation store 309 and an entry with a reference to this code fragment is placed in the include table 310 with a reference to the machine code in the execution codebase 104 and the code context for the fragment. If the same code fragment in the same code context is encountered again during the execution, the execution manager 308 will use the existing machine code in the execution codebase 104. If the include table 310 does not contain an entry for a given code fragment (or if the code fragment has a different code context), the execution manager 308 will activate the code generator 307 to generate machine code for that code fragment in its current code context. The generated machine code will be stored in the execution codebase 104, and an entry with a reference to the code fragment, its current code context, and a reference to the generated machine code, will be stored in the include table 310.

The power of this scheme is that it makes it possible to reuse machine code in combinations that have not been encountered in the past. For example, assume a PHP program contains functions named Foo( ) and Bar( ) which have two different declarations each: Foo(v1), Foo(v2), and Bar(v1), Bar(v2). Assume also that this PHP program is run two times and that in the first run Foo(v1) and Bar(v1) are executed, and in the second run Foo(v2) and Bar(v2) are executed. If in the third run Foo(v1) and Bar(v2) are required to be executed, no machine code generation will be necessary as the execution codebase 104 will have machine code for both Foo(v1) and Bar(v2), even though that particular combination of function executions had not been seen previously.

The execution manager 308 is also responsible for coordinating the execution of multiple instances of the same program code 100 in the execution environment 120. If the execution environment 120 allows multiple instances of the same program code 100 to execute simultaneously, then the resources of the dynamic execution module 101 must be managed to prevent conflict. For example, two processes executing the same program code 100 may attempt to modify the execution context 103 at the same time. The execution manager 308 coordinates the processes so that such modifications of the same common resource can occur without deadlock, race conditions, or other multi-processing errors. The execution manager 308 may use a variety of multi-process management techniques to prevent such errors. These multi-process management techniques are known in the art and are outside the scope of this disclosure. In one embodiment the execution manager 308 keeps a master copy of the execution resources 102 and generates a separate copy of the resources for each executing program code instance. In this embodiment the changes to the execution resources 102 are written back to the master copy after the execution of a program code instance is terminated.

The runtime utilities 311 are modules that assist the execution manager 308 in providing the infrastructure for the dynamic execution process. The runtime utilities 311 include processes that can generate CFG or AST structures from the program code 100, processes that can reset the execution context 103 after the execution of the program code has terminated, and processes to manage the function table 301, variable table 302, tables for user-defined types, allocation table 304, and include table 310.

Figure 4:
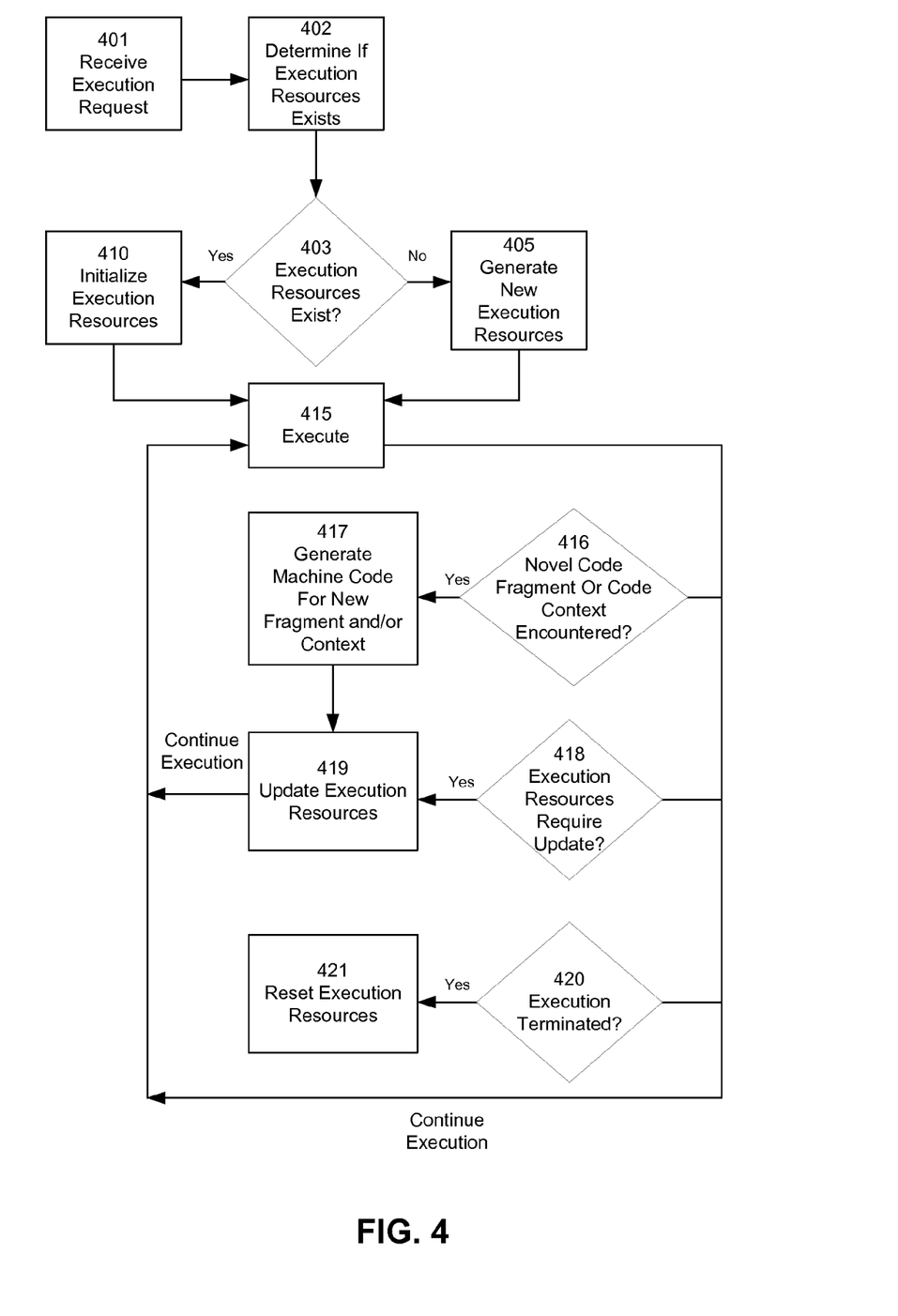
FIG. 4 is a flowchart illustrating the process for executing program code using one embodiment of a dynamic execution module.

FIG. 4 is a flowchart illustrating the process for executing program code using one embodiment of a dynamic execution module. The process begins when a request to execute the program code 100 is received 401 by the dynamic execution module 101. The request may be received from another module in the execution environment 120. For example, a web server process may request the execution of PHP program code for a web page requested by a user.

The execution manager 308 will then determine 402 if execution resources 102 exist for that program code. Execution resources 102 will exist in the dynamic execution module 101 if the same program code 100 has been executed by the dynamic execution module in the past. If the execution resources do not exist 403, the execution manager 308 will activate runtime utilities 311 to generate 405 new execution resources 102 (i.e., the execution context 103 and execution codebase 104). The components of the execution context 103—i.e., function table 301, variable table 302, user-defined type tables (class table 303), allocation table 304, source representation store 309, and include table 310—will be populated with data based on processing the initial code 106. The initial code will be parsed and a representation of the instructions therein will be stored in the source representation store 309. Machine code generated from these initial instructions will be stored in the execution codebase 104, and the include table 310 will be populated with entries that tie the code fragments in the source representation store to the corresponding machine code in the execution codebase. As the initial code 106 is processed to generate the source representation and the machine code, entries for the functions, variables, and user-defined types that are encountered are stored in the function table 301, variable table 302, and user-defined type tables respectively. Allocations for these elements are stored in the allocation table 304.

If the execution resources for the program code 100 already exist 403, then the existing execution context (which will have been reset from previous invocations) will be initialized 410. Initialization of the execution context 103 may involve pre-allocating resources for the execution context based on the requirements estimated by the execution manager 308 from previous executions of the same program code. For example, the allocation table 304 may be allocated memory based on the size of allocations from the previous executions. In addition, the components of the execution resources 102 for a given program code 100 may be pre-populated with data based on previous executions of the same program code. For example, if the same program code has executed in the dynamic execution module 101, then the execution codebase 104 will contain machine code that has been generated from the program instructions that were processed in previous executions. If a program code has executed previously, it is likely that the initial code 106 for this program code has been processed, and machine code for this initial code may be found in the execution codebase 104. Similarly, the source representation store 309 and the include table 310 may include source representations and include table entries for previously processed program instructions. Although all function data, variable data, and user-defined type data from previous executions of a program code 100 are not applicable to subsequent executions of the same program code, some of this data may be reused. This data may be pre-initialized (or preserved) in the function table 301, variable table 302, and various user-defined type tables between executions. For example, the functions, variables, and classes declared in the initial code 106 may be preserved in the function table 301, variable table 302, and class table 303 respectively, since the elements declared in the initial code 106 may be applicable in any invocation of a given program code 100.

Once the execution resources 102 have been initialized, the program execution manager 308 executes 415 the program code 100 through the dynamic execution module 101. Execution of the program code 100 is a different process than executing the program code 100 through other means in the execution environment 120. A typical execution of program code without the dynamic execution module involves processing the instructions of the program code using an interpreter to generate byte codes that may be executed on a virtual machine. In the case of the dynamic execution module 101, the execution of the program code 100 is initiated by executing the machine code instructions in the execution codebase 104 that correspond to the initial code 106. These machine code instructions are present in the execution codebase 104 whether the execution resources 102 were initialized 410 from previous data or generated 405 afresh. Execution of the machine code in the execution codebase 104 produces results that are functionally equivalent to executing the corresponding program code instructions through the conventional process in the execution environment. Although machine code does not directly possess the dynamic aspects of languages such as PHP, Python, Ruby, Perl, etc., the dynamic execution module 101 enables this dynamism through the execution context 103 and the execution support module 105. For example, as the machine code corresponding to the program code 100 executes it may utilize functions, variables, or user-defined types that refer to different elements based on code context. This implements the dynamic declarations and bindings of dynamic languages. If the machine code in the execution codebase 104 had been monolithically generated with direct calls to functions, variables, and user-defined types, this dynamism would have been impossible. However, since for dynamic entities the machine code in the execution codebase 104 does not reference functions, variables, and user-defined types directly, but rather references entries in the function table, variable table, and user-defined type tables, these entries provide a layer of indirection so that the elements used by the executing code for the dynamic entities can be changed based on the code context.

As the machine code in the execution codebase 104 executes, it may attempt to load an additional code fragment from the runtime conditional code 107. If this code fragment has been processed by the dynamic execution module 101 previously (either in this invocation of the program code 100 or in a previous invocation), then a representation of this code fragment will be found in the source representation store 309, and the include table 310 will have an entry for the fragment and the code context in which it was executed previously. If the code fragment is being called in the same code context, then machine code corresponding to the code fragment will be found in the execution codebase 104. If the code fragment in the runtime conditional code 107 has not been changed since this machine code was generated from it, the machine code may be executed directly. However, if a novel code fragment or code context is encountered 416 (or if the runtime conditional code 107 corresponding to the code fragment has changed since machine code was generated for it), then the execution manager 308 will activate the code generator 307 to generate machine code instructions corresponding to the code fragment. These machine code instructions will be stored in the execution codebase 104, and a corresponding entry will be created in the include table 310 with a reference to the machine code in the execution codebase, the source representation of the code fragment in the source representation store 309, and a reference to the code context.

Both the generation of new machine code in the execution codebase 104, as well as the execution of existing machine code may cause the execution resources 102 to require an update 418. The execution resources 102 may be updated 419 by the execution manager and/or one or more of the runtime utilities 311. Execution resource updates may include adding or deleting entries in the function table 301, variable table 302, user-defined type tables (e.g. class table 303), allocation table 304, and include table 310. Updates may also include adding or removing machine code from the execution codebase 104, and adding or removing source representations of code fragments from the source representation store 309. For example, when a novel code fragment is processed by the dynamic execution module 101, new entries in the function table 301, variable table 302, and class table 303 will be generated for the functions, variables, and classes respectively that are discovered in the fragment. Machine code generated from the novel code fragment will be stored in the execution codebase 104 and the source representation store 309 will be updated to include a representation of the fragment. The function, variable, and user-defined type entries may also be updated to include references to the new machine code stored in the execution codebase 104. The execution 415 of the program code 100 then continues.

The execution of the program code 100 may eventually terminate. Termination of the program may occur because the program instructions themselves reach an end point and exit the program, or the program may be halted for other reasons. For example, the program may be terminated by the execution environment 120 because a task has been completed or to free up system resources. If the execution is terminated 420, the execution manager 308 will cause the execution resources 102 to be reset 421. Resetting the execution resources 102 may involve deleting entries from the function table 301, variable table 302, user-defined type tables, and allocation table 304. The execution manager 308 will attempt to preserve as many entries in these tables as possible across invocations of the program code 100; however, some entries will not be applicable across different invocations because their values will be volatile depending on the instructions executed in the program code. For example, entries for variables in the variable store 302 will almost always be deleted because the values of variables will depend on the sequence of operations leading up to their assignment. Variables that are assigned once globally (constants, for example), may be exceptions that can be preserved across invocations. On the other hand, the execution manager 308 may preserve all of the source representations stored in the source representation store 309, the machine code in the execution codebase 104, and the entries in the include table 310. The source representation store 309, include table 310, and execution codebase 104 together provide a means to avoid re-generating machine code for code fragments that have been processed once before. However, if the program code 100 changes drastically, or if errors are found in any of the execution resources 102, the execution manager 308 may hard reset the entire system by freeing the execution resources 102 completely (deleting all components of the resources). Performing a hard reset deletes all the information preserved by the dynamic execution module 101 with respect to a given program code 100, and the next execution of the program code 100 will proceed as though it is the first execution of that code (i.e., it will not benefit from any previous code generation).

To illustrate the above described process a concrete example is now described. Assuming the program code 100 contains PHP code as follows:

```
<?php
function __autoload($className) {
    class ExampleClass {
        var $exampleProp;
    }
}
$object = new ExampleClass( );
$object->exampleProp = $_GET['arg'];
if ($object->exampleProp) {
    function Conditional( ) { return "First Condition\n"; }
} else {
    function Conditional( ) { return "Second Condition\n"; }
}
print Conditional( );
?>
```

The initial state of the dynamic execution module will be as follows (expressed in human-readable text rather than the actual binary representation):

```
Class Table:
    Name -> ID (Table)
    "stdClass" -> 0
    ...
    "ExampleClass" -> 8
    ID -> Active Definition (Array)
    [0] Prototype for stdClass
    ...
    [8] <empty>
Function Table:
    Name -> ID (Table)
    "_autoload" -> 0
    "Conditional" -> 1
    ID -> Active Target (Array)
    [0] <empty>
    [1] <empty>
Source Representation Store (CFG):
    "Main" / Top-level CFGs
    - "PHPEntryFunc" ("main")
    Function -> CFG (Table)
    Conditional (v1) -> CFG for Conditional ("First Condition")
    Conditional (v2) -> CFG for Conditional ("Second Condition")
Execution Codebase:
    - "PHPEntryFunc"
```

In this example the execution resources 102 of the dynamic execution module 101 have been initialized but machine code and state have not yet been generated based on the execution of ExampleClass. The "Class Table" section above shows text output based on the entries in the class table 303. Here only the stdClass has an active definition. The "Function Table" section shows text output based on the entries in the function table 301. Here we see there are two entries in the table for the _autoload function and the Conditional( ) function. The "Active Target" section for these functions is not yet filled in as the PHP has not yet been executed, and there is no machine code as yet for these functions in the execution codebase. The "Source Representation Store" section shows text output based on the state of the CFGs stored in the source representation store 309. Here we have a CFG for the PHPEntryFunc as well as for the two Conditional( ) function declarations. The PHPEntryFunc is the default function which initializes and executes for every PHP program run in the dynamic execution module 101. Some implementations of the dynamic execution module 101 may not have such a function, or may have a different initiation scheme. The "Execution Codebase" section shows text output based on the contents of the execution codebase 104. Here the execution codebase 104 only contains machine code for the PHPEntryFunc, which is the minimal amount of machine code necessary to begin execution of the program. No other machine code has yet been generated for this PHP program.

Now if the PHP program illustrated above is executed with arg=0 as a parameter, the execution resources will be updated as illustrated below:

```
Class Table:
    Name -> ID (Table)
    "stdClass" -> 0
    ...
    "ExampleClass" -> 8
    ID -> Active Definition (Array)
    [0] Prototype for stdClass
    ...
    [8] Prototype for ExampleClass
Function Table:
    Name -> ID (Table)
    "_autoload" -> 0
    "Conditional" -> 1
    ID -> Active Target (Array)
    [0] Pointer to machine code for _autoload
    [1] Pointer to machine code for Conditional (v2)
Source Representation Store (CFG):
    "Main" / Top-level CFGs
    - "PHPEntryFunc" ("main")
    Function -> CFG (Table)
    Conditional (v1) -> CFG for Conditional ("First Condition")
    Conditional (v2) -> CFG for Conditional ("Second Condition")
Execution Codebase:
    - "PHPEntryFunc"
    - _autoload
    - Conditional (v2)
```

Once the program has been executed there are several changes to the execution context. In the class table 303 there is now a prototype for the ExampleClass in addition to the stdClass. In the function table 301 there are now pointers to the execution codebase 104 for the _autoload and Conditional (v2) functions. The latter pointer is the result of the fact that arg=0 causes the program to execute through the "else" branch of the if-then-else statement rather than the "if-then" branch. The source representation store 309 is unchanged because no further PHP has been introduced into the system. On the other hand, the execution codebase 104 now contains machine code that has been generated for the _autoload and Conditional(v2) functions.

Now if the PHP program illustrated above is executed with arg=1 as a parameter, the execution resources will be updated as illustrated below:

```
Class Table:
    Name -> ID (Table)
    "stdClass" -> 0
    ...
    "ExampleClass" -> 8
    ID -> Active Definition (Array)
    [0] Prototype for stdClass
    ...
    [8] Prototype for ExampleClass
Function Table:
    Name -> ID (Table)
    "_autoload" -> 0
    "Conditional" -> 1
    ID -> Active Target (Array)
    [0] Pointer to machine code for _autoload
    [1] Pointer to machine code for Conditional (v1)
Source Representation Store (CFG):
    "Main" / Top-level CFGs
    - "PHPEntryFunc" ("main")
    Function -> CFG (Table)
    Conditional (v1) -> CFG for Conditional ("First Condition")
    Conditional (v2) -> CFG for Conditional ("Second Condition")
Execution Codebase:
    - "PHPEntryFunc"
    - _autoload
    - Conditional (v2)
    - Conditional (v1)
```

The state here changes in two important respects. First, the function table 301 now points to the machine code for Conditional(v1) because the "if-then" branch of the if-then-else statement is traversed. Second, the execution codebase 104 now contains additional machine code for the Conditional (v1) function. Note that Conditional(v2) is also present in the execution codebase. If a future execution of the PHP source code has need again of that branch of the code, machine code generation will not be necessary; only the pointer in the function table 301 will need an update.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for optimized execution of dynamic languages. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for executing computer programs through a dynamic execution module, the method comprising:

receiving a first request to execute a program code in a dynamic language, the program code comprising initial code and runtime conditional code;

responsive to the first request, generating execution resources from the initial code, the execution resources comprising an execution codebase and an execution context, the execution codebase comprising initial machine code generated from the initial code, and the execution context comprising stored references to elements generated for functions, variables, and user-defined types in the initial code;

executing the initial machine code in the execution codebase using the execution context;

responsive to executing the initial machine code in the execution codebase, updating the execution codebase and the execution context using the runtime conditional code to store, in the execution codebase, conditional machine code generated from the runtime conditional code and to map the runtime conditional code and a code context to the stored conditional machine code;

receiving a second request to execute the program code; and executing the initial machine code and executing the conditional machine code in the updated execution codebase using the updated execution context when a current code context corresponds to the code context, otherwise generating and executing updated conditional machine code based at least on the runtime conditional code, and mapping the runtime conditional code and the current code context to the updated conditional machine code in the execution codebase.

2. The computer-implemented method of claim 1, wherein executing the initial machine code in the execution codebase using the execution context further comprises accessing elements generated for functions, variables, and user-defined types using the stored references.

3. The computer-implemented method of claim 1, wherein the runtime conditional code comprises a function and the code context comprises at least one include with which the function is invoked.

4. The computer-implemented method of claim 1 wherein the execution context further comprises a function table, a variable table, and a class table that contain the stored references to elements.

5. The computer-implemented method of claim 4 wherein updating the execution context further comprises storing, in the function table, variable table, and class table, references to elements generated for functions, variables, and classes in the runtime conditional code.

6. The computer-implemented method of claim 5 wherein the execution context further comprises a source representation store, and updating the execution context further comprises storing a representation of a portion of the runtime conditional code in the source representation store.

7. The computer-implemented method of claim 6, wherein the execution context further comprises an include table, and updating the execution context further comprises generating an entry in the include table, the entry comprising a first reference to the portion of the runtime conditional code in the source representation store, the code context, and a second reference to the conditional machine code in the execution codebase.

8. The computer-implemented method of claim 1 wherein the execution context further comprises an allocation table, the allocation table comprising elements allocated for the variables and user-defined types in the program code.

9. The computer-implemented method of claim 1 wherein the program code, the initial code, and the runtime conditional code comprise computer instructions in PHP.

10. A computer for executing computer programs through a dynamic execution module, the computer comprising:
a non-transitory computer-readable storage medium storing executable computer program instructions for executing computer programs through a dynamic execution module, the instructions executable to perform steps comprising:
receiving a first request to execute a program code in a dynamic language, the program code comprising initial code and runtime conditional code;
responsive to the first request, generating execution resources from the initial code, the execution resources comprising an execution codebase and an execution context, the execution codebase comprising initial machine code generated from the initial code, and the execution context comprising stored references to elements generated for functions, variables, and user-defined types in the initial code;
executing the initial machine code in the execution codebase using the execution context;
responsive to executing the initial machine code in the execution codebase, updating the execution codebase and the execution context using the runtime conditional code to store, in the execution codebase, conditional machine code generated from the runtime conditional code;
mapping the runtime conditional code and a code context to the stored conditional machine code in the execution codebase;
receiving a second request to execute the program code; and
executing the initial machine code and executing the conditional machine code in the updated execution codebase using the updated execution context when a current code context equates to the code context, otherwise generating and executing updated conditional machine code based at least on the runtime conditional code, and mapping the runtime conditional code and the current code context to the updated conditional machine code in the execution codebase; and
a processor for executing the computer program instructions.

11. The computer of claim 10 wherein executing machine code in the execution codebase using the execution context further comprises accessing elements generated for functions, variables, and user-defined types using the stored references.

12. The computer of claim 10, wherein updating the execution codebase further comprises storing the machine code generated from the runtime conditional code in the execution codebase.

13. The computer of claim 12, wherein the execution context further comprises a function table, a variable table, and a class table that contain the stored references to elements.

14. The computer of claim 13 wherein updating the execution context further comprises storing, in the function table, variable table, and class table, references to elements generated for functions, variables, and classes in the runtime conditional code.

15. The computer of claim 14 wherein the execution context further comprises a source representation store, and updating the execution context further comprises storing a representation of a portion of the runtime conditional code in the source representation store.

16. The computer of claim 15, wherein the execution context further comprises an include table, and updating the execution context further comprises generating an entry in the include table, the entry comprising a first reference to the portion of the runtime conditional code in the source representation store, the code context, and a second reference to the machine code generated from the runtime conditional code in the execution codebase.

17. The computer of claim 10 wherein the execution context further comprises an allocation table, the allocation table comprising elements allocated for the variables and user-defined types in the program code.

18. The computer of claim 10, wherein the runtime conditional code comprises a function and the code context comprises at least one include, parameter, or namespace with which the function is invoked.

19. A non-transitory computer-readable storage medium storing executable computer program instructions for executing computer programs through a dynamic execution module, the instructions executable to perform steps comprising:
receiving a first request to execute a program code in a dynamic language, the program code comprising initial code and runtime conditional code;
responsive to the first request, generating execution resources from the initial code, the execution resources comprising an execution codebase and an execution context, the execution codebase comprising initial machine code generated from the initial code, and the execution context comprising stored references to elements generated for functions, variables, and user-defined types in the initial code;
executing the initial machine code in the execution codebase using the execution context;
responsive to executing the initial machine code in the execution codebase, updating the execution codebase and the execution context using the runtime conditional code to store, in the execution codebase, conditional machine code generated from the runtime conditional code;
mapping the runtime conditional code and a code context to the stored machine code in the execution codebase;
receiving a second request to execute the program code; and
executing the initial machine code and the conditional machine code in the updated execution codebase using the updated execution context when a current code context corresponds to the code context, otherwise generating and executing updated conditional machine code based at least on the runtime conditional code, and mapping the runtime conditional code and the current code context to the updated conditional machine code in the execution codebase.

20. The computer-readable storage medium of claim 19, wherein the program code comprises a function and the code context comprises at least one include with which the function is invoked.

* * * * *